(12) United States Patent
Alvini

(10) Patent No.: US 9,797,537 B2
(45) Date of Patent: Oct. 24, 2017

(54) DEVICE FOR SECURING A LEAK, PREMISES EQUIPPED WITH SUCH A DEVICE AND ASSOCIATED LEAK-SECURING METHOD

(71) Applicant: TOTAL SA, Courbevoie (FR)

(72) Inventor: Gérard Alvini, Pau (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 15/027,194

(22) PCT Filed: Sep. 10, 2014

(86) PCT No.: PCT/FR2014/052244
§ 371 (c)(1),
(2) Date: Apr. 4, 2016

(87) PCT Pub. No.: WO2015/049430
PCT Pub. Date: Apr. 9, 2015

(65) Prior Publication Data
US 2016/0238176 A1  Aug. 18, 2016

(30) Foreign Application Priority Data

Oct. 3, 2013 (EP) .................................. 13306377
Oct. 23, 2013 (FR) .................................. 13 60312
Apr. 3, 2014 (FR) .................................. 14 52939

(51) Int. Cl.
*F16L 55/07* (2006.01)
*F17C 13/12* (2006.01)

(52) U.S. Cl.
CPC .............. *F16L 55/07* (2013.01); *F17C 13/12* (2013.01); *F17C 2205/0332* (2013.01); *Y10T 137/5762* (2015.04)

(58) Field of Classification Search
CPC ... F16L 55/07; F17C 13/12; F17C 2205/0332; Y10T 137/5762
(Continued)

(56) References Cited

U.S. PATENT DOCUMENTS 3,436,197 A * 4/1969 Borst et al. ............. F16L 55/07
137/312
3,802,458 A * 4/1974 Wilmeth ................ F16K 15/044
137/312
(Continued)

FOREIGN PATENT DOCUMENTS

| EP | 0232478 A2 | 8/1987 |
| FR | 2988081 A1 | 9/2013 |
| WO | WO 98/39091 A1 | 9/1998 |

OTHER PUBLICATIONS

International Search Report with English translation for PCT/FR2014/052244, mailed Jan. 5, 2015, 4 pages.
(Continued)

*Primary Examiner* — Kevin Lee
(74) *Attorney, Agent, or Firm* — Patterson Thuente Pedersen, P.A.

(57) ABSTRACT

The invention relates to a device for securing a leak of fluid from equipment containing a pressurised fluid. The device comprising a gas-tight containment device disposed around the equipment and defining a volume, Vconf, between the inner surface of the sealed containment device and the outer surface of the equipment. A vent is formed by one or more ports in the sealed containment device, each port being defined by its cross-section and shape. According to the invention, the volume, Vconf, the cross-section and the shape of each port are configured such that, in the event of a leak of flow rate Qf, the fluid is discharged through each port in the form of a turbulent jet.

14 Claims, 3 Drawing Sheets

(58) Field of Classification Search
USPC .......................................................... 137/312
See application file for complete search history.

(56) References Cited

U.S. PATENT DOCUMENTS

| | | | | |
|---|---|---|---|---|
| 5,249,696 | A | * 10/1993 | Bryant et al. ...... | B65D 51/1683 137/312 |
| 5,848,606 | A | * 12/1998 | Zimmer et al. ......... | B41F 15/40 137/561 A |
| 2015/0114976 | A1 | * 4/2015 | Barker .................. | B29C 67/243 220/592 |

OTHER PUBLICATIONS

FR Search Report for FR 13 60312, dated Jul. 17, 2014, 8 pages.
FR Search Report for FR 14 52939, dated Dec. 19, 2014, 7 pages.

* cited by examiner

DEVICE FOR SECURING A LEAK, PREMISES EQUIPPED WITH SUCH A DEVICE AND ASSOCIATED LEAK-SECURING METHOD

RELATED APPLICATIONS

The present application is a National Phase entry of PCT Application No. PCT/FR2014/052244, filed Sep. 10, 2014, which claims priority from EP Patent Application No. 13306377.6, filed Oct. 3, 2013, and which claims priority from FR Patent Application No. 13 60312, filed Oct. 23, 2013, and which claims priority from FR Patent Application No. 14 52939, filed Apr. 3, 2014, said applications being hereby incorporated by reference herein in their entirety.

FIELD OF THE INVENTION

The present invention relates to a device for securing a leak; it is also aimed at premises equipped with such a device and an associated method for securing a leak.

BACKGROUND OF THE INVENTION

Such a leak securing device is designed to secure (make safe) equipment containing a pressurized fluid.

Equipment containing a pressurized fluid is also known as "pressure equipment".

The term "pressure equipment" covers a piece of equipment or collection of pieces of equipment intended for producing, manufacturing, storing or using compressed, liquefied or dissolved vapors or gases at pressures higher than atmospheric pressure.

By way of example of pressure equipment, mention may be made of the following equipment: a turbine, a pump, a diesel engine, an exchanger, a pipe, a valve, a column, a drum, a tank. The piping and safety accessories also form part of the pressure equipment.

This pressure equipment may present a significant risk in the event of failure, notably in the event of a leak. The danger stems notably from the quantity of energy stored in pneumatic form, and increases if the pressurized fluid itself is dangerous (flammable, toxic, explosive, etc.). If a component ruptures, a shockwave, intense thermal effects, or very high speed blasting of debris may occur.

It is therefore appropriate to secure such pressure equipment.

SUMMARY OF THE INVENTION

In order to improve known leak securing devices, the invention is aimed at a device for securing a leak of a fluid that may occur in pressure equipment containing that fluid, in which the securing device is configured to secure a leak having a given leakage flow rate of said fluid, $Q_f$, said securing device comprising:
- a gastight containment device, arranged around the pressure equipment and defining a volume $V_{conf}$ between the internal surface of said fluidtight containment device and the external surface of the pressure equipment;
- a vent made up of one or more orifice(s) in the fluidtight containment device, each orifice being defined by its cross section and by its shape;
- according to the present invention, the volume $V_{conf}$ the cross section and the shape of each orifice are configured so that in the event of a leak with a flow rate Qf, the fluid is discharged through each orifice in the form of a turbulent jet.

The presence, thus defined, of a gastight containment device arranged around the pressure equipment, and of a vent made up of one or more orifice(s) in said fluidtight containment device allows the pressurized fluid to expand in the event of leakage into the volume $V_{conf}$ then discharge from the gastight containment device in the form of one or more turbulent jet(s). This then allows the fluid to concentrate toward each orifice and this is particularly advantageous in the case of a fluid that presents risks of explosion with the gas(es) surrounding the gastight containment device.

In the usual way, a "jet" means the movement of a fluid exiting with force, bursting forth from the place in which it is contained, generally via a small opening; a jet extends in a direction substantially perpendicular to the cross section of the opening from which it bursts forth. In the case of a circular opening, a jet has more or less the shape of a cone frustum with a cone angle less than or equal to 20° or even 10°.

In the usual way, "turbulent" means a fluid flow mode in which a chaotic agitation movement is superposed on the mean movement of the fluid. Turbulence is characterized by the existence of transfers of material that take place in directions other than the mean direction of flow. In turbulent flow, the inertia forces predominate over the viscosity forces; this phenomenon arises in flow conditions above a threshold value. The "Reynolds number" $R_e$ of a fluid in a given configuration is one of the indicators that allow the turbulence of a fluid to be characterized.

The Reynolds number is a dimensionless quantity which represents the ratio between the inertia forces and the viscous forces.

It is defined as follows:

$$Re = \frac{VL}{\upsilon}$$

where
V: is the characteristic velocity of the fluid;
L: is the characteristic dimension;
v: is the dynamic viscosity of the fluid.

In the case of a pipe with a circular cross section, in which the diameter is the characteristic dimension, it is found that the flow is turbulent when the Reynolds number is higher than a threshold value of between 2000 and 3000.

It should be noted that a person skilled in the art easily knows how to recognize whether a fluid is exhibiting turbulent flow; he may notably make observations of the flow of the fluid and determine whether this flow exhibits swirling, this being one of the easily recognizable features of turbulent flow.

The present invention is also aimed at a leak securing device comprising the features listed in the following embodiments, which can be combined with one another in any technically conceivable configuration:
- the fluid is a gas, notably selected from one or more gases from the list consisting of methane, propane; according to another embodiment, the fluid is a liquid, notably selected from one or more liquids from the list consisting of a liquefied gas;
- the fluid is at a pressure of between 100 and 1000 bar in the equipment when the equipment is in operation;

the equipment is chosen from a rotary machine or a static device, notably chosen from one or more pieces of equipment from the list consisting of a turbine, a pump, a diesel engine, an exchanger, a pipe, a valve, a column, a drum, a tank;

the given leakage flow rate Qf is between 1 and 10 kilograms per second (kg/s);

the fluidtight containment device is formed essentially of a wall placed on a plinth on which the pressure equipment rests; according to one embodiment, this wall is made of a deformable material, for example a composite material containing carbon fiber and/or aramid fiber, notably Kevlar® or Nomex®; according to one embodiment, the deformable material is supported by a metallic structure;

the Reynolds number of the fluid discharging through each orifice in the form of a turbulent jet is between $10^5$ and $10^6$;

the shape of an (or of the) orifice(s) in the fluidtight containment device is multilobed;

at least one orifice in the fluidtight containment device is extended in the direction of discharge of the jet of fluid by a dilution device able to dilute the fluid of the jet using a gas situated beyond the external surface of the fluidtight containment device; according to one embodiment, the dilution device is a Venturi-effect mixer; according to one embodiment, the dilution device is a succession of Venturi-effect mixers; according to one embodiment, the cross section of the Venturi-effect mixer(s) is multilobed; according to one embodiment, the surface of the Venturi-effect mixer(s) is rough; according to one embodiment, one or more component(s) of the dilution device is extended in the direction of discharge of the jet of fluid by a grating designed to generate turbulence in the fluid of the jet.

The present invention is also aimed at a premises equipped with at least one leak securing device according to any one of the embodiments of the present invention as listed hereinabove.

The present invention is also aimed at an above premises further comprising a plurality of walls and, in at least one wall, an opening device that can be actuated by the thrust exerted by the turbulent jet of fluid during the leak; according to one embodiment, the actuatable opening device is a valve placed in a wall in line with an orifice, in the direction of the turbulent jet of fluid leaving said orifice.

The present invention is also aimed at a method for securing pressure equipment in the event of a leak of a pressurized fluid therefrom, implementing at least one leak securing device according to any one of the embodiments of the present invention as listed hereinabove, and comprising the following successive steps:

the fluid is left to spread out in the gastight containment device;

the fluid is allowed to discharge in the form of a turbulent jet through each orifice of the vent.

Depending on the embodiment of said securing method, the latter comprises the following additional step:

the fluid is allowed to become diluted beyond an orifice in the direction of discharge of the jet of fluid by virtue of a dilution device so as to dilute the fluid of the jet with a gas situated beyond the external surface of the fluidtight containment device.

The present invention is also aimed at a method for calculating the characteristics of a leak securing device according to any one of the embodiments of the present invention as listed hereinabove, implemented by computer processing means in which:

a fluid leakage flow rate Qf is input;

the geometric characteristics of the pressure equipment are input;

the geometric characteristics of the gastight containment device and of the vent such that the fluid is discharged through each orifice of the vent in the form of a turbulent jet are calculated by iteration and/or by optimization.

The present invention is also aimed at the use of at least one leak securing device as claimed in any one of the embodiments of the present invention as listed hereinabove or of a premises according to the present invention as listed hereinabove, under very cold weather conditions. What is meant by "very cold" weather conditions are conditions in which the outdoor temperatures are below or equal to −40° C., notably below or equal to −50° C. These conditions are notably encountered in an arctic environment.

BRIEF DESCRIPTION OF THE DRAWINGS

The following examples illustrate the present invention.

The invention will be better understood if reference is made to the attached drawings in which.

Figure 1:
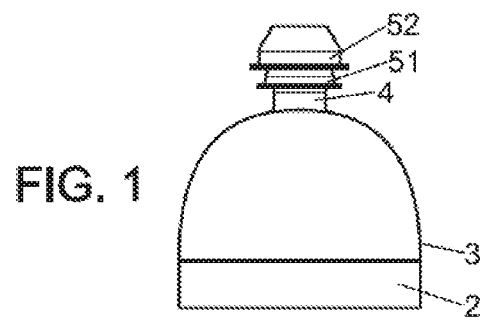
FIG. 1 schematically depicts a side view of one embodiment of a leak securing device according to the invention protecting equipment.
Figure 2:
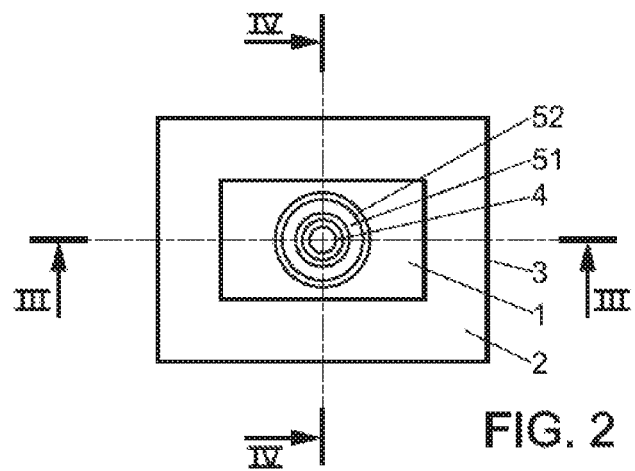
FIG. 2 schematically depicts a plan view of one embodiment of a leak securing device according to the invention protecting equipment.
Figure 3:
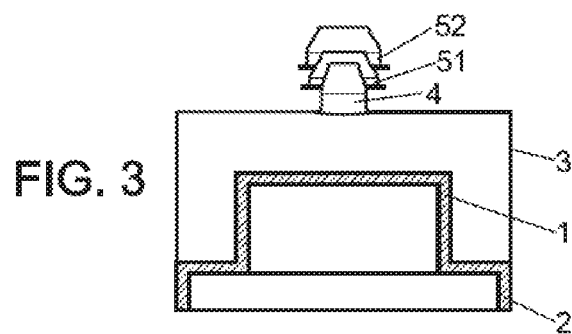
FIG. 3 schematically depicts a view in section on III-III of one embodiment of a leak securing device according to the invention protecting equipment.
Figure 4:
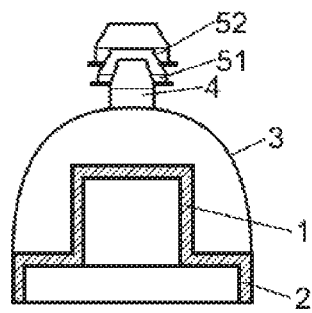
FIG. 4 schematically depicts a view in section on IV-IV of one embodiment of a leak securing device according to the invention protecting equipment.
Figure 5:
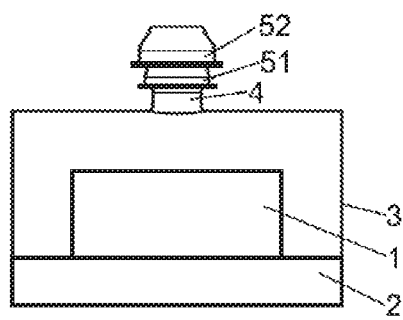
FIG. 5 schematically depicts a front elevation of one embodiment of a leak securing device according to the invention protecting equipment.
Figure 6:
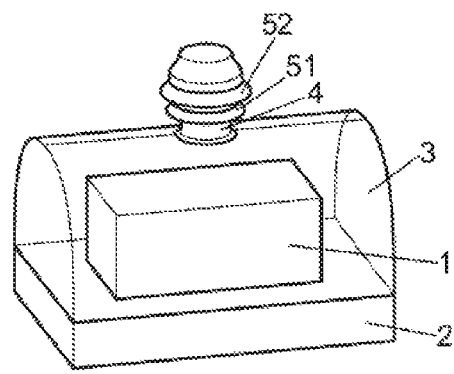
FIG. 6 schematically depicts an isometric view of one embodiment of a leak securing device according to the invention protecting equipment.

It should be noted that the components of the device depicted have not necessarily been drawn to scale and that the sole purpose of the figure is to make the present invention easier to understand.

DETAILED DESCRIPTION OF THE DRAWINGS

In the example depicted in FIGS. 1 to 6 pressure equipment 1 is illustrated, protected by a securing device according to the present invention, in which said securing device comprises a gastight containment device 3 arranged around the equipment 1 on a plinth 2.

This fluidtight containment device 3 comprises a vent 4 situated in its upper part.

For the purposes of the present description, the line corresponding to the bottom of the plinth 2 on which the pressure equipment 1 rests is defined as a horizontal reference line; this line may notably correspond to the ground on which the plinth 2 rests. An up-and-down direction is defined along a line perpendicular to said horizontal line, where the top is situated above the vent 4 and the bottom under the plinth 2.

A first component is considered to be situated above or higher up than a second component if the first component is positioned closer to the top than the second component; likewise, a first component is considered to be below or lower down than a second component if the first component is positioned closer to the bottom than the second component.

In order to dimension the securing device according to the present invention, consideration is given to a given leakage flow rate $Q_f$ of pressurized fluid. This leakage flow rate Qf is defined as a function of the characteristics of the equipment that is to be protected and is generally defined by services responsible for the safety of pressure equipment. Some of the parameters taken into consideration in defining the leakage flow rate Qf include, for example: the type of fluid, the dimensions of the equipment that is to be protected, the pressure of the fluid when the equipment is in operation, the temperature of the fluid when the equipment is in operation.

The volume $V_{conf}$ is defined between the internal surface of said fluidtight containment device 3 and the external surface of the pressure equipment 1 containing that fluid.

The vent 4 is made up of one or more orifice(s) in the fluidtight containment device, each orifice being defined by its cross section and by its shape. In the case depicted, there is one single circular orifice in the fluidtight containment device and the vent and the orifice are therefore the same thing. However, numerous other forms of embodiment may be envisioned, notably in which the vent 4 is made up of several orifices and/or in which the orifices are not circular but may have other shapes, such as notably the shape of an ellipse, a square, a parallelepipedal slot. More complex shapes may also be chosen.

The volume $V_{conf}$ the cross section and the shape of the orifice of the vent 4 are configured so that in the event of a leak with a flow rate Qf, the fluid discharges through the orifice in the form of a turbulent jet. In the event of there being a plurality of vent orifices, the volume $V_{conf}$, the cross section and the shape of the orifices of the vent are configured so that in the event of a leak with a flow rate Qf, the fluid discharges through each orifice in the form of a turbulent jet.

In the event of a leak of a fluid from a component of the pressure equipment 1 implementing the leak securing device described hereinabove:

the pressurized fluid extends into the gastight containment device 3;
then the pressurized fluid discharges in the form of a turbulent jet through the orifice of the vent 4.

The volume $V_{conf}$ allows the pressurized fluid first of all to expand into the volume; the pressurized fluid is therefore not in the presence of the environment surrounding the gastight containment device; it very rapidly fills the volume $V_{conf}$ and is confined in the first few moments after a leak; as soon as the volume $V_{conf}$ is full, the pressurized fluid discharges in the form of a turbulent jet through each orifice of the vent 4.

According to one exemplary embodiment, the fluid is a gas, notably selected from one or more gases of the list consisting of methane, propane.

According to another exemplary embodiment, the fluid is a liquid, notably selected from one or more liquids of the list consisting of a liquefied gas.

By way of example, the fluid is at a pressure of between 100 and 1000 bar in the equipment when the equipment is in operation.

By way of example, the given leakage flow rate Qf is between 1 and 10 kilograms per second (kg/s).

By way of example, the Reynolds number of the fluid discharging through the orifice in the form of a turbulent jet is between $10^5$ and $10^6$.

According to one embodiment of the example depicted in FIGS. 1 to 6, the fluidtight containment device is formed essentially of a wall placed on a plinth 2 on which the pressure equipment rests, in which the wall is made of a deformable material, for example a composite material containing carbon fiber and/or aramid fiber, notably Kevlar® or Nomex®. Choosing a deformable material allows controlled deformation of the fluidtight containment device when the pressurized fluid is released; choosing a composite material containing carbon fiber and/or aramid fiber means that the high loadings to which the containment device may be subjected can be withstood. This is because these materials are capable of deforming to a large extent without tearing. The deformable material is, for example, supported by a metallic structure.

Furthermore, the orifice in the fluidtight containment device is extended in the direction of discharge of the jet of fluid by a dilution device able to dilute the fluid of the jet using a gas situated beyond the external surface of the fluidtight containment device. The dilution device is a succession of two Venturi-effect mixers 51, 52. The surface of the Venturi-effect mixer(s) may be rough.

These various means make it possible to increase the turbulence of the fluid in the jet and to increase the dilution of the pressurized fluid with the environment surrounding the gastight containment device.

It is possible to increase the turbulence still further by adding to the dilution device a grating that is placed in the direction of discharge of the jet of fluid.

Figure 7:
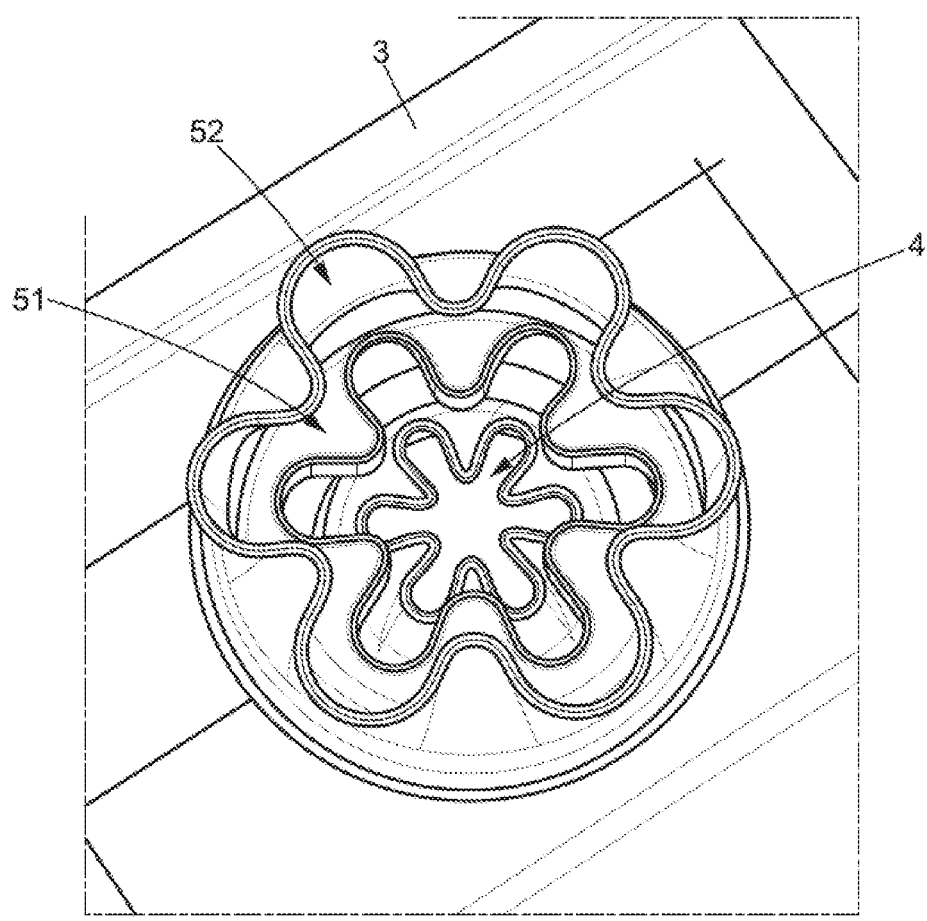
FIG. 7 schematically depicts part of an embodiment of a leak securing device according to the invention, in plan view.

In one embodiment depicted in FIG. 7, the shape of the orifice 4 in the fluidtight containment device is multilobed. The cross section of the two Venturi-effect mixers 51, 52 is also multilobed. These multilobed shapes make it possible to increase still further the turbulence and the dilution of the pressurized fluid with the environment.

According to one embodiment that has not been depicted, the leak securing device according to the present invention and described hereinabove is installed in a premises, for example in the form of a shed, which comprises a plurality of walls. An opening device that can be actuated by the thrust exerted by the turbulent jet of fluid during the leak, for example a valve, is arranged in the wall situated in the direction of the turbulent jet of fluid leaving the orifice. This opening device is arranged in a wall in line with the orifice; the turbulent jet of fluid leaving the orifice actuates it by thrust when a leak occurs, thus allowing the pressurized fluid to be discharged from the premises.

The present device is particularly well suited to cases in which the pressurized fluid is an explosive gas (for example methane or propane) because it first of all allows the gas to become concentrated, thereby avoiding the risks of explosion, and then allows the gas to be diluted with the environment surrounding the fluidtight containment device; this environment is generally made up of air. In this way it is possible to prevent the pressurized fluid from remaining in a critical concentration range within which the risks of explosion are at a maximum.

However, the invention is not restricted to equipment containing a pressurized explosive gas but may find applications in equipment containing some other pressurized fluid.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A device for securing a leak of a fluid that may occur in a pressure equipment containing that fluid, in which the device for securing a leak is configured to secure a leak having a given leakage flow rate a fluid $Q_f$ said securing device comprising:
    a fluidtight containment device, arranged around the pressure equipment and defining a volume $V_{conf}$ between an internal surface of said fluidtight containment device and an external surface of the pressure equipment;
    a vent made up of one or more orifice(s) in the fluidtight containment device, each orifice being defined by its cross section and by its shape;
    and in which the volume $V_{conf}$ and the cross section and the shape of each orifice are configured so that in the event of a leak with a flow rate Qf, the fluid is discharged through each orifice in the form of a turbulent jet
    and in which at least one orifice in the fluidtight containment device is extended in a direction of discharge of the jet of fluid by a dilution device able to dilute the fluid of the jet using a gas situated beyond the external surface of the fluidtight containment device.

2. The device for securing a leak of a fluid as claimed in claim 1, in which the fluid is a gas.

3. The device for securing a leak of a fluid as claimed in claim 1, in which the fluid is a liquid.

4. The device for securing a leak of a fluid as claimed in claim 1, in which the fluidtight containment device is formed essentially of a wall placed on a plinth on which the pressure equipment rests, and in which the wall is made of a deformable material.

5. The device for securing a leak of a fluid as claimed in claim 1, in which the shape of the orifice in the fluidtight containment device is multilobed.

6. The device for securing a leak of a fluid as claimed in claim 1, in which the dilution device is a Venturi-effect mixer or a succession of Venturi-effect mixers.

7. The device for securing a leak of a fluid as claimed in claim 1, in which one or more component(s) of the dilution device is/are extended in a direction of discharge of the jet of fluid by a grating that generates a turbulence in the fluid of the jet.

8. A premises equipped with at least one device for securing a leak of a fluid as claimed in claim 1.

9. The premises equipped with at least one device for securing a leak of a fluid as claimed in the claim 8, comprising a plurality of walls and, in at least one wall, an opening device that can be actuated by a thrust exerted by the turbulent jet of fluid during the leak.

10. A method for securing pressure equipment in the event of a leak of a pressurized fluid therefrom, the method comprising:
    implementing a device for securing a leak of a fluid as claimed in claim 1;
    allowing the fluid to spread out in the gastight containment device; and
    allowing the fluid to discharge in the form of a turbulent jet through each orifice of the vent.

11. The securing method as claimed in claim 10, comprising the following additional step:
    allowing the fluid to become diluted beyond an orifice in a direction of discharge of the jet of fluid by virtue of a dilution device so as to dilute the fluid of the jet with a gas situated beyond the external surface of the fluidtight containment device.

12. A method for calculating the characteristics of a device for securing a leak of a fluid as claimed in claim 1, implemented by computer processing means in which:
    inputting a fluid leakage flow rate Qf;
    inputting the geometric characteristics of the pressure equipment;
    calculating by iteration and/or by optimization the geometric characteristics of a gastight containment device and of the vent such that the fluid is discharged through each orifice of the vent in the form of a turbulent jet are calculated by iteration and/or by optimization.

13. The securing method as claimed in claim 10, wherein the use of at least one leak securing device is under conditions in which the outdoor temperatures are below or equal to −40° C.

14. The device for securing a leak of a fluid as claimed in claim 4, in which the deformable material is a composite material containing carbon fiber and/or aramid fiber.

* * * * *